United States Patent [19]

Heal et al.

[11] Patent Number: 4,482,848
[45] Date of Patent: Nov. 13, 1984

[54] CONTROLLABLE POWER SOURCE

[75] Inventors: John C. W. Heal, Coalville; George G. Dixon, Evington, both of England

[73] Assignee: The Marconi Company Limited, Chelmsford, England

[21] Appl. No.: 376,701

[22] Filed: May 10, 1982

[30] Foreign Application Priority Data

May 8, 1981 [GB] United Kingdom ................. 8114143

[51] Int. Cl.³ .............................................. H02M 1/14
[52] U.S. Cl. ...................................... 318/98; 318/99; 363/124
[58] Field of Search ........ 318/410, 414, 438, 376–378, 318/504–507, 519, 99, 98, 434; 363/17, 20, 21, 23, 28, 138, 139, 124; 323/272, 346; 361/79

[56] References Cited

U.S. PATENT DOCUMENTS

| | | | |
|---|---|---|---|
| 3,750,002 | 7/1973 | Gerhard | 318/139 |
| 3,947,740 | 3/1976 | Tsuboi | 318/376 |
| 4,131,829 | 12/1978 | Gocho | 318/139 |
| 4,179,645 | 12/1979 | Wehrmüller et al. | 318/139 |
| 4,264,948 | 4/1981 | Simmons et al. | 363/17 |
| 4,340,931 | 7/1982 | Endo et al. | 363/124 |

Primary Examiner—E. A. Goldberg
Assistant Examiner—A. Evans
Attorney, Agent, or Firm—Spencer & Frank

[57] ABSTRACT

A controllable power source is suitable for driving one or more electric motors from a low voltage battery. A converter steps up the d.c. voltage to a higher level at which the motors are designed to operate and a power regulator placed between the converter and each motor regulates the power which is drawn at the higher voltage by the motors. A current limit is imposed on the converter which is significantly less than the maximum current handling capabilities of the motors, so that when a motor attempts to draw an excessive current the output voltage of the converter drops accordingly. This enables the overall power handling capability of the converter to be minimize, while still allowing a motor to draw maximum current or maximum voltage, but not both simultaneously.

8 Claims, 2 Drawing Figures

CONTROLLABLE POWER SOURCE

BACKGROUND OF THE INVENTION

This invention relates to controllable power sources and is particularly suitable for controlling the amount of electric power which is applied to a machine from a low voltage electric source, such as a battery. It is generally undesirable to drive a high power machine, such as a rotatable motor directly from a low voltage battery, since the current required is extremely large and this results in consequential excessive electrical losses, i.e. the efficiency with which power is transferred from the battery to the motor is relatively low, and can be particularly low when the motor is operating at maximum power. In principle it is more efficient to convert the low voltage which is available from the battery to a high voltage which is then applied as required to a motor which is designed to operate at the high voltage. It can be shown that such a system is capable of higher overall efficiency, but even so it is difficult and sometimes impracticable to design a controllable power source which is capable of providing maximum power for all possible combinations of current and voltage demands.

SUMMARY OF THE INVENTION

The present invention takes advantage of the fact that electric machines, such as motors, are not likely to demand the maximum available current and the maximum available voltage simultaneously.

According to this invention, a controllable power source includes a voltage converter arranged to produce a relatively high a.c. or d.c. voltage from a lower d.c. voltage applied to it; and a power regulator connected to receive the high voltage and to apply a controlled power level to an output port at which the maximum current demand which can be made upon the power regulator exceeds the current level which the converter is able to supply to the regulator whilst maintaining its maximum available high voltage.

Preferably the power regulator is a chopper amplifier whose mark-to-space ratio is varied in dependence on the power required to be fed to the output port. Thus the controllable power source operates to maintain the maximum output voltage of which it is capable until the current drawn at its output port rises to the maximum value which the converter can supply to the regulator. Thereafter, if the current demand continues to rise, the output voltage available at the output port decreases. Thus the controllable power source is able to provide at different times maximum current and maximum voltage which are greatly in excess of that which it could provide simultaneously. An output characteristic of this nature is particularly suitable for driving a rotating machine for which maximum current and voltage demands are unlikely to occur simultaneously. The power source is thus able to provide maximum current or maximum voltage whilst having a power handling capability which can be very much less than the product of the two values.

BRIEF DESCRIPTION OF THE DRAWINGS

The invention is further described by way of example with reference to the accompanying drawings, in which.

DESCRIPTION OF THE PREFERRED EMBODIMENTS

Figure 1:
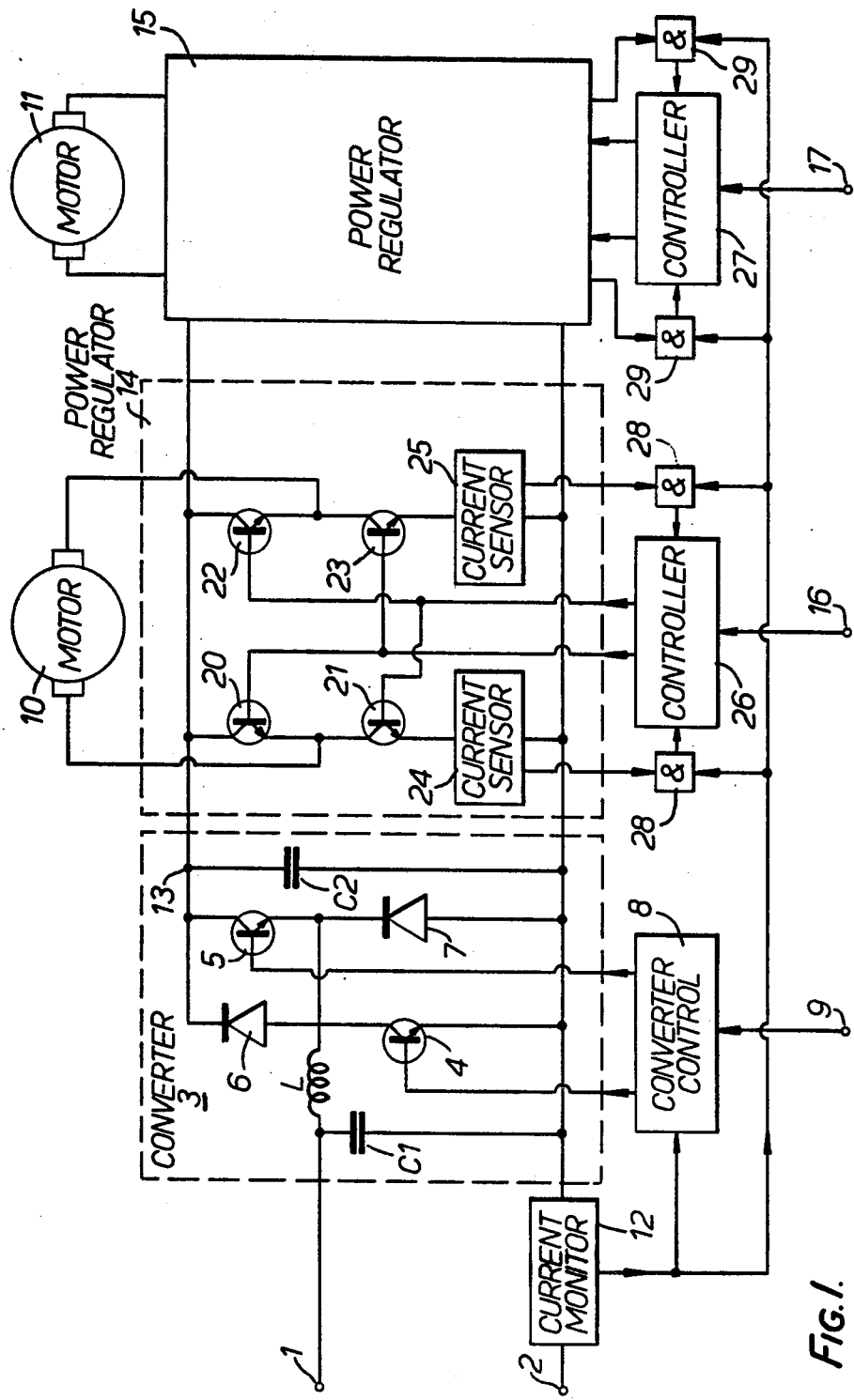
FIG. 1 shows a controllable power source.

Referring to FIG. 1, the controllable power source receives its energy from a primary low voltage supply via terminals 1 and 2. Typically, the supply comprises a battery capable of providing a nominal d.c. voltage of about 28 volts. It is assumed that the battery is of large capacity and is capable of providing very large output currents, typically well in excess of 100 amps. The inevitable losses involved in handling currents of this magnitude are relatively great, and in this invention the d.c. voltage supplied by the battery is raised to a much higher level, typically about 180 volts, as at voltages of this order the current which must be drawn from the output terminals of the controllable power source to provide a given power level is very much less. The required higher voltage level is generated at a converter 3 shown within the broken line box. This converter is of a bi-directional nature and is capable not only of providing power to a device under load, but is also capable of returning power from the device to the battery, thereby minimizing energy losses. In the present example, the electrical energy is used to drive two electric motors 10 and 11 and it is the electrical energy which is regenerated by the motors when they are braking that is transferred back to the battery.

The converter 3 comprises two switchable transistors 4 and 5, each of which is in series with a diode 6 or 7 respectively. The transistor 4 and the diode 6 operate to produce the higher output voltage at point 13 and the magnitude of this voltage is related to the input voltage present at terminals 1 and 2 by a factor related to the on-off time ratio of the transistor 4. During the time that transistor 4 is on, i.e. conductive, current flows from the battery via an input inductor L and through the transistor 4. When the transistor 4 is rendered non-conductive the current flowing throught the inductor L is diverted through the diode 6 to point 13 and capacitor C2 as the diode 6 is then forward biased.

Converters of this kind are well known and it is not thought necessary to provide a detailed description of their mode of operation. Capacitor C1 is present to reduce excessive voltage ripples on the input terminals 1 and 2, the capacitor C2 is present to maintain the level of the output voltage at point 13 during those periods when transistor 4 is conductive and diode 6 is therefore non-conductive. Clearly the voltage on capacitor C2 will decay during these periods to some extent, but the magnitude of the decay, (or "voltage droop" as it is sometimes termed), is a function of the size of the capacitor as well as the magnitude of the current drawn at point 13 and in practice capacitor C1 can be chosen so as to provide an acceptably constant output voltage.

The transistor 5 and its associated diode 7 operate to transfer power from the output point 13 of the converter back to the battery when the motors 10 and 11 are regenerating power. The on-off ratios of the transistors 4 and 5 are determined by a converter control unit 8, which receives at terminal 9 a signal indicative of the required nominal (i.e. maximum) output voltage. However, the on-off ratio is subject to a maximum value which is determined by a current monitor 12 which monitors the current flowing between the battery and the converter 3 to prevent excessively high currents being drawn. Thus if the current drawn at point 13 rises to a level at which the current flowing through the monitor 12 exceeds a pre-set value, the on-off ratio of transistor 4 is reduced accordingly, and consequently the voltage available at point 13 is decreased.

The voltage generated by the converter 3 at output terminal 13 is applied via two power regulators 14 and 15 to the respective motors 10 and 11. The regulators 14 and 15 operate to draw power from the converter 3 and to apply it to the motors 10 and 11 in dependence on control signals present at terminals 16 and 17. Each power regulator is a chopping amplifier having two pairs of switches 20, 21 and 22, 23. Transistors 20 and 23 are switched together in synchronism, as are transistors 21 and 22. By rendering transistors 20 and 23 conductive, current is fed through the motor 10 with a polarity which rotates the motor in its forward direction, and conversely by rendering transistors 21 and 22 conductive, the motor is caused to rotate in its reverse direction. The control signals applied to the power regulators 14 and 15 are, of course, such that transistors 20 and 21 cannot be conductive simultaneously, and such that transistors 22 and 23 can not be rendered conductive simultaneously since this would short out the high voltage provided by the converter 3.

The periods for which each pair of transistors 20 and 23, or 21 and 22 is conductive as compared with the period for which they are non-conductive represents the duty ratio of the regulator, and determines the magnitude of the power which is applied to the motor 10. Thus by increasing the mark-to-space ratio under the action of a respective controller 26 or 27 in response to the control signal at terminal 16 or 17, more energy is applied to the motor, and current sensors 24 and 25 are provided to prevent excess current being drawn by the power regulators 14 and 15. The current sensors 24 and 25 operate in conjunction with the current monitor 12 to control the duty ratio of the power regulators 14 and 15—the control signals produced at the current sensors 24 and 25 are combined at respective logic gates 28 and 29 with the output of the current monitor 12, and the respective combined signals are used to limit the duty ratio of the appropriate controller 26 or 27.

Figure 2:
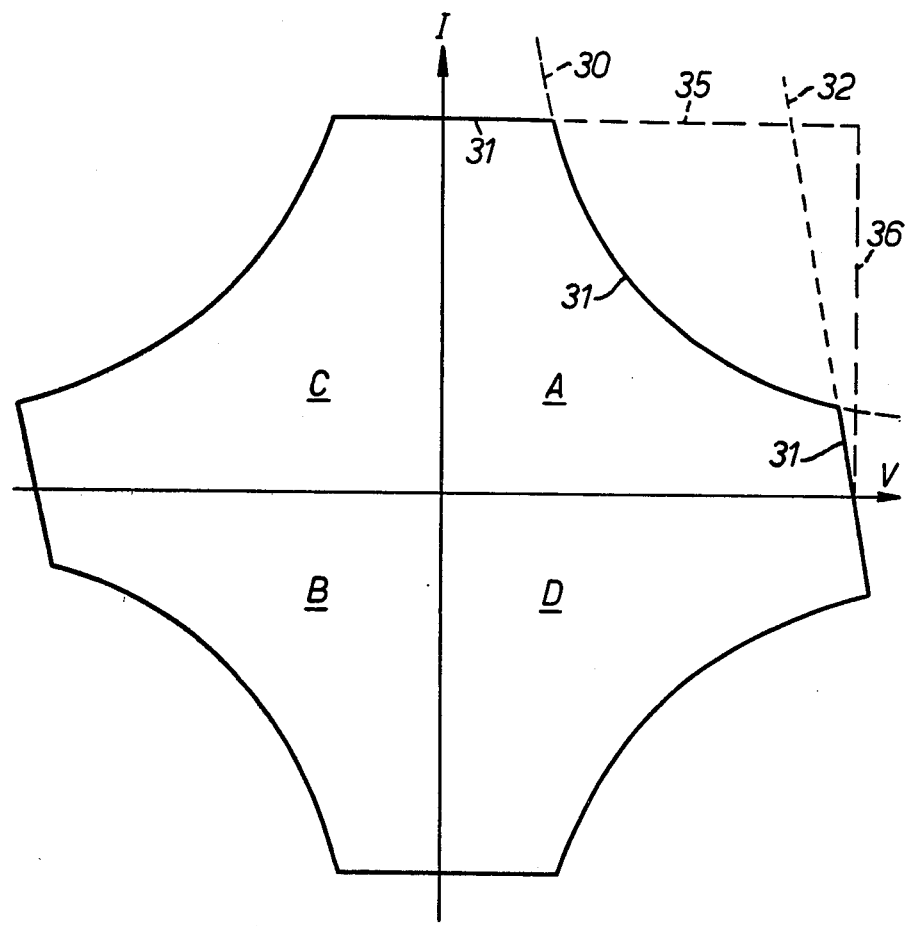
FIG. 2 is an explanatory diagram.

The operating characteristic of each of the regulators 14 and 15 is shown by the broken lines 35, 36 in the first quadrant of FIG. 2. It is apparent that each regulator is capable of handling maximum current and maximum voltage simultaneously, but this would exceed the power handling capability of the converter 3, which has an operating characteristic indicated by the hyperbolic curve 30. The overall characteristic of the converter 3 in combination with the regulators is shown by the solid line 31 and it will be seen that this consists of the central portion of the hyperbolic curve, but which is truncated at maximum values of current and voltage. The maximum available voltage is actually a function of current as shown by the dotted line 32, and the extent to which this dotted line 32 is off-set from the vertical line 36 is a function of power losses in the cables, etc. The magnitude of the power limit represented by line 31 is determined by the level at which the current sensor 12 is set and it is because this level is lower than the current handling capability of the regulators 14 and 15 that the overall characteristics of the power source is determined by that of the converter 3. The consequence of this power limit is that the motors cannot draw maximum current and maximum voltage simultaneously, but, in practice, this is not a serious disadvantage as it is only rarely that the theoretical maximum power of the motors would be required. Maximum voltage is still available to rotate the motor at full speed, and maximum current is available when the greatest torque is required. However, despite maximum current and maximum voltage being available separately when required, the maximum power handling capability of the system is substantially reduced, and this enables the system to be designed accordingly, thus allowing considerable economies to be made. In particular, the power handling capability of the converter 3 can be reduced to realistic levels.

Quadrants A and B of FIG. 2 relate respectively to the conditions under which a motor is being driven by the power source in a forward and reverse direction, whereas quadrants C and D represent to conditions under which the motor regenerates energy whilst braking.

The arrangement which is used to limit the power which is fed to each of the two power regulators 14 and 15 allows both motors 10 and 11 to be driven from a common converter 3, as it is only that motor 10 or 11 which is drawing excessive power, and which therefore causes the current sensor 12 to operate, which has its available power limited. This is caused by the appropriate logic gate 28 or 29 operating to reduce the duty ratio of the respective regulator 14 or 15. This permits the other motor to continue normal operation in accordance with its power requirements and prevents its operation being adversely affected when the first motor requires an unacceptably high power level.

We claim:
1. A controllable power source including voltage converter means, having a converter input port and a converter output port that is different from said converter input port, for receiving an applied d.c. voltage at the converter input port and producing from it a higher a.c. or d.c. voltage at the converter output port; a power regulator having a regulator input port connected to the converter output port to receive the higher voltage and having a regulator output port for providing a controlled power level; and converter control means connected to said converter means for controlling the value of said higher voltage in accordance with a predetermined characteristic so that the high voltage value and the current provided by said regulator output port result in a product having a predetermined maximum.

2. A power source as claimed in claim 1 and wherein the power regulator is a chopper amplifier whose mark-to-space ratio is varied in dependence on the power required to be fed to the regulator output port.

3. A power source as claimed in claim 1 and wherein said predetermined characteristic is such that the locus of said product valves lies on a hyperbolic curve as said current provided by said regulator output port varies.

4. A power source as claimed in claim 1, 2 or 3 and wherein means are provided for monitoring an input current drawn by the converter at the lower voltage, and for reducing the level of said higher voltage when a monitored current exceeds a threshold value.

5. A power source as claimed in claim 4 and wherein the level of said higher voltage is progressively reduced as the size of the monitored current continues to rise so as to provide a substantially constant output power while the monitored current exceeds said threshold value.

6. A power source is claimed in claim 1, 2 or 3 and wherein a plurality of power regulators are connected to receive said higher voltage.

7. A power source as claimed in claim 6 and wherein means are provided for sensing the current drawn by each regulator, and for controlling a power output level of any regulator which attempts to draw current at a level which causes the monitored current to exceed said threshold value.

8. A power source as claimed in claim 1 or 2 and wherein the converter means is bi-directional so that when current from a load is forced into the regulator output port, power is returned to a power supply connected to the converter input port at the lower voltage.

* * * * *